United States Patent
Camenisch et al.

(10) Patent No.: US 9,667,428 B2
(45) Date of Patent: May 30, 2017

(54) PRODUCTION OF CRYPTOGRAPHIC SIGNATURES

(71) Applicant: INTERNATIONAL BUSINESS MACHINES CORPORATION, Armonk, NY (US)

(72) Inventors: Jan L. Camenisch, Thalwil (CH); Anja Lehmann, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 14/669,976

(22) Filed: Mar. 26, 2015

(65) Prior Publication Data
US 2015/0280923 A1 Oct. 1, 2015

(30) Foreign Application Priority Data
Mar. 28, 2014 (GB) .................................. 1405597.4

(51) Int. Cl.
*H04L 9/08* (2006.01)
*H04L 9/32* (2006.01)
*H04L 29/06* (2006.01)

(52) U.S. Cl.
CPC ............ *H04L 9/3257* (2013.01); *H04L 9/085* (2013.01); *H04L 9/321* (2013.01); *H04L 9/3226* (2013.01);
(Continued)

(58) Field of Classification Search
CPC ....... H04L 9/3257; H04L 9/321; H04L 9/085; H04L 9/3226; H04L 63/083; H04L 2209/04
See application file for complete search history.

(56) References Cited

U.S. PATENT DOCUMENTS

| | | | |
|---|---|---|---|
| 2009/0097661 A1* | 4/2009 | Orsini ................... | H04L 9/083 380/279 |
| 2013/0055380 A1* | 2/2013 | Swann ................ | G06F 21/6245 726/18 |

(Continued)

OTHER PUBLICATIONS

Franks et al., RFC 2617: HTTP Authentication: Basic and Digest Access Authentication, Jun. 1999, IETF.*

(Continued)

*Primary Examiner* — Saleh Najjar
*Assistant Examiner* — Louis Teng
(74) *Attorney, Agent, or Firm* — Tutunjian & Bitetto, P.C.; Jeff LaBaw

(57) ABSTRACT

A method and system configured to produce a cryptographic signature on a message, under a key, at a user computer wherein the key is shared between the user computer, which stores a first key-share, and an authentication computer, which stores a second key-share and a first authentication value. The user computer encodes the message to produce a blinded message, produces the first authentication value from a user password and a secret value, and produces a second authentication value by encoding the first authentication value and a nonce. The authentication computer uses the nonce to determine if the first authentication value is correct and, if so, encodes the blinded message using the second key-share to produce a partial signature. The user computer produces a signature on the message under the key by encoding the partial signature and the message using the first key-share and an unblinding function.

14 Claims, 2 Drawing Sheets

(52) U.S. Cl.
CPC ........ *H04L 63/083* (2013.01); *H04L 2209/04* (2013.01)

(56) References Cited

U.S. PATENT DOCUMENTS

2013/0191632 A1* 7/2013 Spector .................. H04L 9/083
713/155
2015/0281211 A1* 10/2015 Josang ................. H04L 63/083
726/5

OTHER PUBLICATIONS

Desmedt, Threshold cryptosystems, 1993, Springer Berlin Heidelberg, vol. 718 of the series Lecture Notes in Computer Science, pp. 1-14.*
Boldyreva, A., "Efficient threshold signatures, multisignatures and blind signatures based on the Gap-Diffie-Hellman-group signature scheme," Lecture Notes in Computer Science, vol. 2567, Jan. 2003. (pp. 31-46).
Gjosteen, K. et al., "Password-Based Signatures," Lecture Notes in Computer Science, vol. 7163, Sep. 2011. (pp. 17-33).
Gjosteen, K., "Partially blind password-based signatures using elliptic curves," IACR Cryptology ePrint Archive. Jul. 2013. (pp. 1-17) Available at https://eprint.iacr.org/2013/472.
He, Y.Z., et al., "Server-Aided Digital Signature Protocol Based on Password," 39th Annual 2005 International Carnahan Conference on Security Technology, Oct. 2005. (4 Pages).
Nicolosi, A. et al., "Proactive Two-Party Signatures for User Authentication," Proceedings of the 10th ISOC Network and Distributed System Security Symposium, Feb. 2003. (16 Pages).

* cited by examiner

PRODUCTION OF CRYPTOGRAPHIC SIGNATURES

BACKGROUND

Technical Field

This invention generally relates to production of cryptographic signatures in data processing systems. Methods, systems and computer programs are provided for producing a cryptographic signature on a message at a user computer under a key x which is shared between the user computer and an authentication computer.

Description of the Related Art

Cryptographic signatures are widely used in data processing systems for protecting messages communicated over the system against unauthorized access by parties other than the legitimate sender and recipient. A cryptographic signature is produced by encoding the message using a cryptographic key in accordance with an algorithm defined by the signature scheme. The signature can only be decoded to reveal the message by a recipient in possession of the correct key. Signature schemes commonly use a pair of cryptographic keys, namely a secret key known only to one party to the scheme, and a public key which is available to all users of the scheme. A message signed under a sender's secret key can be decoded by a recipient using the sender's public key. Since the secret signing key is known only to the sender, correct decoding using the sender's public key confirms the authenticity of the message.

Cryptographic keys are increasingly stored and used on personal computer devices such as smart phones and laptop computers. Unfortunately, such devices are vulnerable to viruses and other malware, so users run the risk that their cryptographic keys will be compromised by such malware. One approach to counter this is to store keys on a secure hardware device such as a smart card. As the secure device does not typically have a screen, keyboard or other user interface, the secure device still has to be used in conjunction with a personal computer device in order to perform operations with the keys. So while this approach prevents theft of the keys by malware, the malware may still make use of the keys without the user noticing. Furthermore, if the hardware device is lost or stolen, the keys are also lost and can be misused by unauthorised parties. Additional protection of the keys is therefore required. Methods here include use of some form of password which the user must provide each time the key is used. However, passwords are inherently vulnerable to offline guessing attacks, as they must be short enough for users to remember.

Key-sharing schemes are known whereby a cryptographic key is shared between a plurality of entities, e.g., servers in a data processing system, each of which holds a respective share of the key. The cryptographic key is, thus, some function of all the individual key-shares. A signature under the cryptographic key can be jointly produced by the entities, each of which sees the message and uses its key-share to perform part of the signature scheme, such that a full signature under the shared key is obtained at the end of the process.

Blind signature schemes are known whereby a user can obtain a signature on a message from a signing entity without the signing entity seeing the message. An example of a blind signature scheme using Boneh Lynn Shacham ("BLS") signatures is discussed in "Efficient threshold signatures, multisignatures and blind signatures based on the Gap-Diffie-Hellman-group signature scheme", Boldyreva, Public Key Cryptography 2003, Lecture Notes in Computer Science Vol. 2567, Springer-Verlag, 2003. With these schemes the signer has full control of the signing key and the signature process.

Password-based signatures are also known and are discussed in "Password-based Signatures", Gjøsteen and Thuen, EuroPKI 2011, LNCS 7163, pp. 17-33, 2012; and "Partially blind password-based signatures using elliptic curves", Kristian Gjøsteen. These schemes allow a user with a password to obtain a signature with the help of a server without revealing the message to the server. In "Password-based Signatures", for example, the server does not hold the entire signing key, but only a share of it. The user's password is the second share of the signing key and is used to complete the final signature. However, various security problems are associated with prior password-based signature schemes. For example, though the signing process may fail if the user password is incorrect, the signature scheme can be readily subverted if the user password is weak. The systems are vulnerable to online attacks, e.g., where an adversary makes repeated requests while guessing the password. An adversary may also make one request with a bad password and then use the information obtained in an offline guessing attack. Moreover, these schemes require the server to be fully-trusted, and there is no protection against offline attacks if information from the server leaks.

SUMMARY

An embodiment of a first aspect of the present invention provides a method for producing a cryptographic signature on a message, under a key x, at a user computer of a data processing system wherein the key x is shared between the user computer, which stores a first key-share, and an authentication computer of said system. The authentication computer stores a second key-share and a first authentication value which encodes a secret value of the user computer and a predetermined user password. The method comprises:

at the user computer, in response to provision of the message and input of said user password, encoding the message to produce a blinded message, producing said first authentication value from the password and said secret value and producing a second authentication value which encodes the first authentication value and a nonce, and sending the second authentication value and the blinded message to the authentication computer;

at the authentication computer, in response to receipt of the blinded message and the second authentication value, using said nonce to determine if the first authentication value encoded in the second authentication value is correct and, if so, encoding the blinded message using the second key-share to produce a partial signature and sending the partial signature to the user computer; and at the user computer, producing a signature on the message under said key x by encoding the partial signature and the message using the first key-share and an unblinding function for unblinding the blinded message in the partial signature.

With signature methods embodying this invention, a user can only obtain a signature on the message under the signing key x if a valid password is input at the user computer and verified at the authentication computer. Hence, unlike prior password-based signature schemes where a user password is required but the server has no means to check if it is correct, the authentication computer here can determine whether the password is valid. In particular, the authentication computer checks the second authentication value sent by the user computer to verify that the first authentication value, produced by the user computer from the input password and encoded in the second authentication value, is correct (i.e., corresponds to the value stored in memory at the authentication computer). The authentication computer does not learn the message, which it receives in blinded form, and neither party can sign without cooperation of the other. Moreover, the use of the authentication value in this system provides a mechanism for detecting on-line attacks while inhibiting offline guessing attacks, even if information from the server should leak. This is discussed further below. Embodiments of the invention may, thus, offer exceptionally secure and efficient schemes for generating signatures on messages while protecting the signing keys.

The message to be signed may be any type of message on which a signature needs to be generated, e.g., for authentication to a third party or for digitally signing a document, under the cryptographic key x. Such a message may comprise data input by the user or otherwise provided in the user computer, such as information stored in memory or generated elsewhere in the system, e.g., by an application running on the user computer. The message is sent to the authentication computer in blinded form so that the authentication computer does not learn the message. (Blinding is a widely-used cryptographic procedure whereby a message can be hidden, or blinded, by encoding the message using a selected function. Decoding (unblinding) of a blinded message can be achieved by performing the inverse of the blinding encoding). Preferred embodiments include, at the user computer, selecting a random value r and using this random value in the encoding to produce the blinded message. When the final signature is later produced from the partial signature using the first key share and the unblinding function, the unblinding function then includes the same random value r.

In some embodiments, the secret value encoded in the first authentication value may be the first (i.e., user's) key-share. In other embodiments, this secret value differs from the first key-share and is also stored by the user computer. The nonce used in generating the second authentication value prevents use of this same value in replay attacks (the nonce, as is well-known in cryptography, being an arbitrary value which is used only once in communications). The second authentication value will, thus, differ for different signature operations. The nonce for any given operation is known to both user computer and authentication computer. While alternatives might be envisaged, the nonce is preferably issued by the authentication computer for the signing process. Preferred embodiments therefore include: at the user computer, prior to producing the second authentication value, sending a nonce request to the authentication computer; and, at the authentication computer, in response to receipt of the nonce request, sending the nonce to the user computer.

An embodiment of a second aspect of the invention provides a user computer for producing a cryptographic signature on a message under a key x which is shared between the user computer and an authentication computer, wherein the authentication computer stores a second key-share and a first authentication value which encodes a secret value of the user computer and a predetermined user password. The user computer comprises memory for storing a first key-share, a user interface, a communications interface for communicating with the authentication computer, and control logic adapted:

in response to provision of the message and input, via said user interface, of said user password, to encode the message to produce a blinded message, to produce said first authentication value from the password and said secret value and produce a second authentication value which encodes the first authentication value and a nonce, and to send the second authentication value and the blinded message to the authentication computer via said communications interface; and in response to receipt from the authentication computer of a partial signature produced by encoding the blinded message using the second key-share, to produce a signature on the message under said key x by encoding the partial signature and the message using the first key-share and an unblinding function for unblinding the blinded message in the partial signature.

An embodiment of a third aspect of the invention provides an authentication computer for use in producing a cryptographic signature on a message, under a key x, at a user computer wherein the key x is shared between the user computer, which stores a first key-share, and the authentication computer. The authentication computer comprises:

memory for storing a second key-share and a first authentication value which encodes a secret value of the user computer and a predetermined user password;

a communications interface for communicating with the user computer; and control logic adapted, in response to receipt from the user computer of a blinded message, which is produced at the user computer by encoding the message to be signed, and a second authentication value which is produced at the user computer by encoding a nonce and said first authentication value, to use said nonce to determine if the first authentication value encoded in the second authentication value is correct and, if so, to encode the blinded message using the second key-share to produce a partial signature and send the partial signature via said communications interface to the user computer.

Further aspects of the invention provide computer programs comprising program code means for causing a computer to implement, respectively, a user computer according to the second aspect of the invention and an authentication computer according to the third aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

The invention further provides a data processing system comprising a user computer according to the second aspect of the invention and an authentication computer according to the third aspect of the invention.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE EMBODIMENTS

Figure 1:
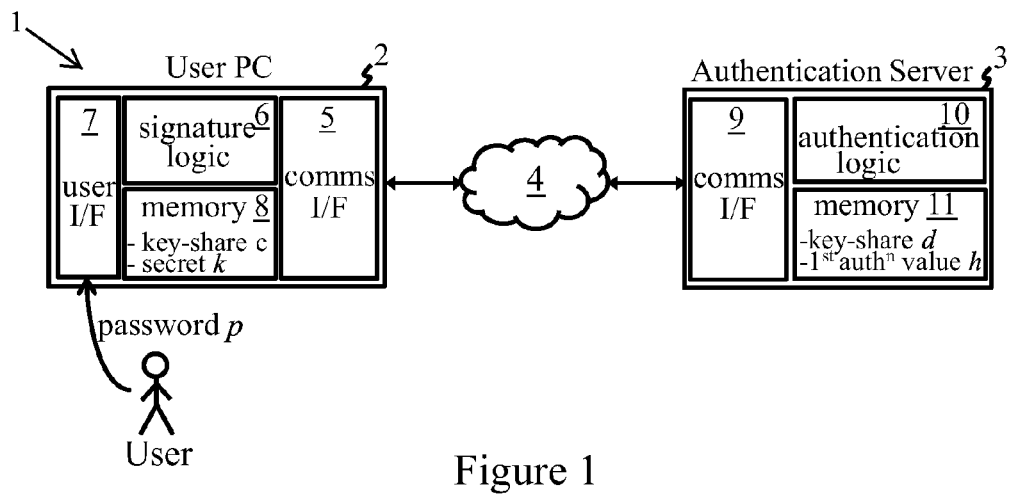
FIG. 1 is a schematic illustration of a data processing system for implementing a cryptographic signature scheme embodying the invention in accordance with the present principles.

FIG. 1 shows an exemplary data processing system 1 for implementing a cryptographic signing method embodying the invention. The system 1 comprises a user computer 2 and an authentication computer 3 arranged for communication over a data communications network 4. Network 4 may, in general, comprise one or more component networks or internetworks, including the Internet. In this example, user computer 2 is implemented by a general purpose personal computer ("PC"), and authentication computer 3 is embodied as a general purpose computer implementing a server for communication with remote computers over network 4. User PC 2 is shown simply here as comprising a communications interface 5 for communicating with server 3 over network 4, signature logic 6 providing functionality for use in the signature scheme to be described, a user interface 7 for data input/output interactions with the user, and memory 8. Memory 8 stores data used by signature logic 6 in operation of the signature scheme. In the present embodiment, this data includes a secret value k and a first key-share c as discussed further below. Authentication server 3 is shown comprising a communications interface 9, authentication logic 10 providing functionality for use in the signature scheme detailed below, and memory 11 which stores data used by logic 10 in operation. This includes a second key-share d and a first authentication value h as discussed further below.

In general, the signature logic 6 and authentication logic 10 could be implemented in hardware or software or a combination thereof. In this example, signature logic 6 is conveniently implemented by software running on user computer 2 for causing the computer to perform the functions described. Similarly, authentication logic 10 is conveniently implemented by software for controlling authentication computer 3 to implement the functionality described.

The signature method implemented by system 1 allows the user PC 2 to produce a cryptographic signature on a message under a secret key x which is shared between the user PC 2 and the authentication server 3. Hence, the signing key x is some function of the first and second key-shares c and d, stored by computers 2 and 3 respectively, where the key-sharing function can vary according to the particular signature algorithm employed. The signature scheme requires input by the user of a user password p at user computer 2. A signature can only be generated if authentication server 3 has verified that the user password p is correct.

Figure 2A:
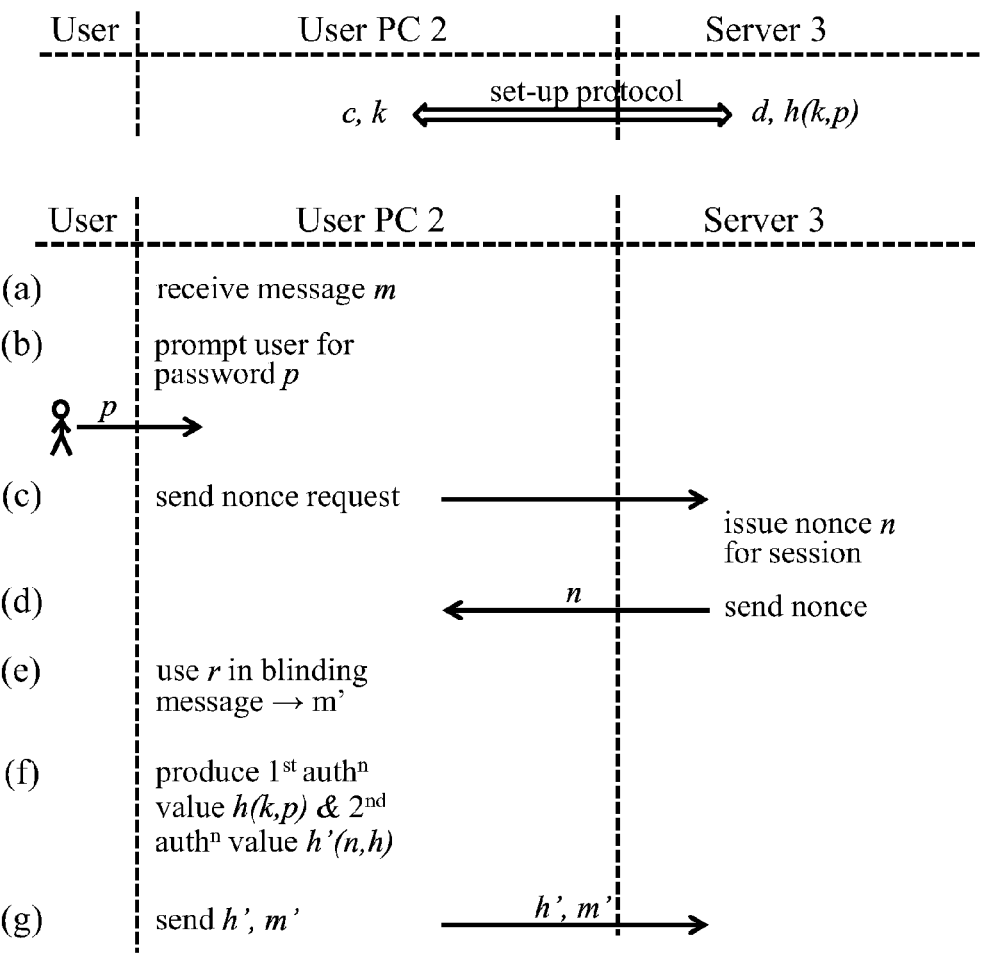
FIGS. 2a and 2b indicate steps performed in operation of the signature scheme in accordance with the present principles.
Figure 2B:
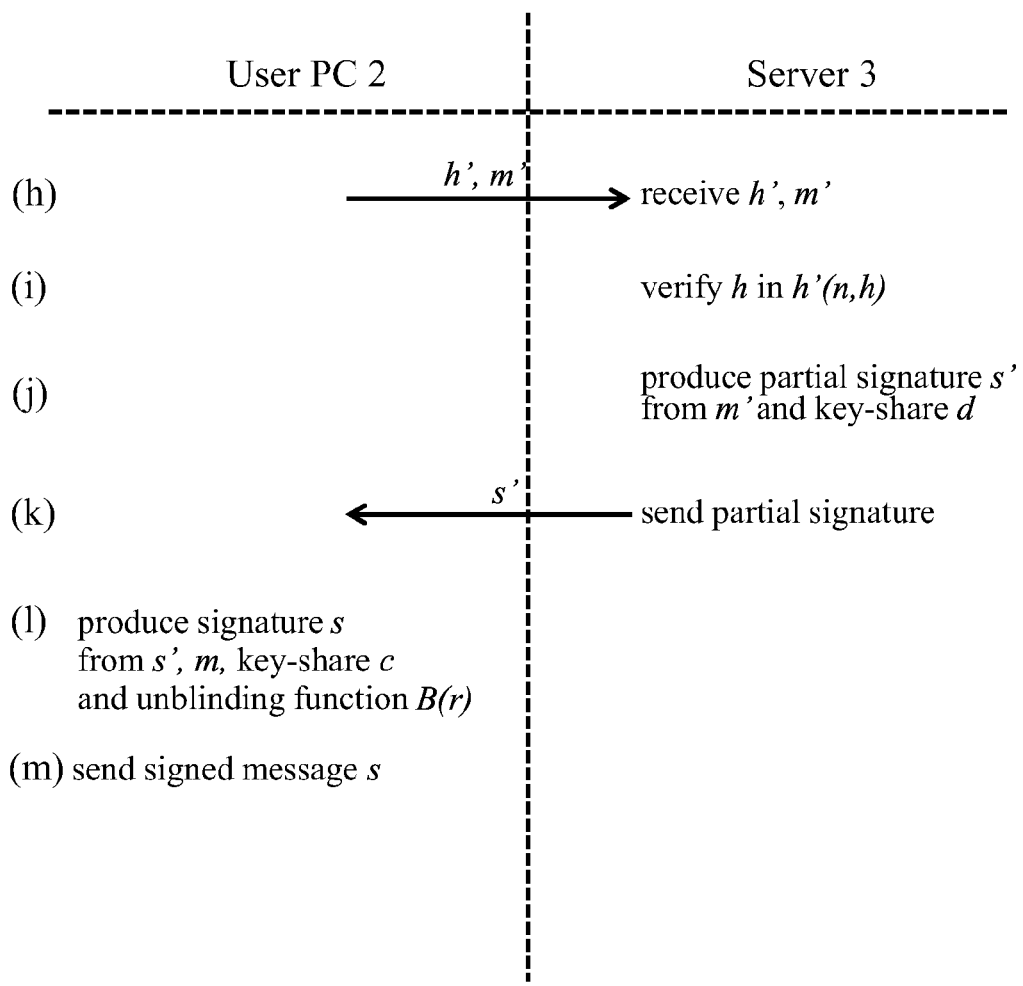

The main steps in operation of the signature scheme are illustrated in FIGS. 2a and 2b. FIG. 2a illustrates a first part of the scheme in terms of interaction between the user, the user PC 2, and the authentication server 3 whose operations are indicated respectively in the left-hand, central and right-hand columns of the figure. The operation assumes that the user PC 2 and authentication server 3 have initially run a setup protocol, as indicated at the top of the figure, to setup the shared key x and parameters of the signature scheme including the user password p. The set up procedure can be performed using generally known cryptographic techniques and may be based on any convenient key-sharing protocol. Such protocols are well-known in the art and need not be described in detail here. The process results in each party storing their respective key-shares c and d without either party learning the other party's share. In this preferred embodiment, the password setup procedure involves the user selecting/obtaining a password p and a secret value k being stored in memory 8 of user computer 2. The secret value k is a cryptographically strong secret which can be generated in any convenient manner as will be apparent to those skilled in the art. The password setup process also provides the authentication server 3 with the first authentication value h which is produced by cryptographically encoding the user password p and the secret value k stored by user PC 2. The first authentication value h is provided to server 3, and stored in memory 11 thereof, without the server 3 learning either the secret value k or the user password p. The password setup protocol can be performed in any convenient manner using generally known techniques, and may involve issue of the password to the user via an independent mechanism, e.g., at a post office, and/or communication with user computer 2 over network 4, for example as part of the key-sharing exchange.

After the setup procedure, user PC 2 stores the first key-share c and the secret value k, and server 3 stores the second key-share d and the first authentication value h which encodes the secret k and password p. This setup protocol is performed once between user PC 2 and server 3, allowing subsequent operation of the signature protocol as required for user messages. The signature protocol commences, as indicated at step (a) of FIG. 2a, when signature logic 6 receives a message m to be signed. The message data may be generated, for example, through user input via user interface 7. In step (b) of the process, the signature logic 6 issues a password prompt to the user who then inputs the password p via user interface 7. Next, in step (c), the signature logic 6 sends a nonce request to server 3 via communications interface 5. The request is received by authentication logic 10 of server 3. In response, authentication logic 10 issues a cryptographic nonce n for the session, sends the nonce n to user PC 2 in step (d), and stores the nonce n in memory 11 for use later in the protocol.

On receipt of the nonce n, in step (e) of the process, the signature logic 6 selects a random value r, and uses r in encoding the message m to produce a blinded message m'. In step (f), the signature logic 6 then encodes the input user password p and the secret value k to produce the first authentication value h. The authentication value h is then further encoded with the session nonce n to produce a second authentication value h'. Next, in step (g), the signature logic 6 sends the blinded message m' and the second authentication value h' to server 3 via communications interface 5. Note that neither the user password p nor the first authentication value h is retained in memory of user PC 2.

FIG. 2b illustrates the next part of the signature process, commencing with receipt of the blinded message m' and the second authentication value h' by authentication server 3 in step (h). In step (i), the authentication logic 10 first uses the nonce n issued in step (d) above to determine if the first authentication value h encoded in the received value h' is correct according to the value of h pre-stored in memory 11 during setup. If not, then the signature process fails, and a notification to this effect may be sent to user PC 2. If the authentication value h is verified as correct, this confirms that the correct password p was entered by the user in step (b). In this event, operation proceeds to step (j) in which the authentication logic 10 encodes the blinded message m' using the second key-share d to produce a partial signature s'. The authentication logic 10 then sends the partial signature s' back to user PC 2 in step (k).

In step (1), on receipt of the partial signature s' at user PC 2, the signature logic 6 produces a full signature s on the message under the key x by encoding the partial signature s' and the message m using the first key-share c and an unblinding function B(r). The unblinding function B(r) serves to unblind the blinded message m' in the partial signature s' as explained further below. In the final step (m) of the process, the resulting signature s, encoding the message m, can then be sent to the intended recipient, e.g., another computer connected to network 4, which can verify the signature and decode the message m in the usual way for the signature scheme.

An exemplary implementation of the foregoing signature scheme is described in detail in the following. The process to be described employs cryptographic techniques based on bilinear maps and BLS signatures. Bilinear maps are well-known for use in cryptographic applications. BLS signatures, as described in detail in "Short signatures from the Weil pairing" Boneh, Lynn and Shacham, Asiacrypt 01, 2001, use a signature scheme which exploits bilinear maps. A brief description is given in the following to assist understanding of the embodiment to be described.

Bilinear Maps

Let $G$ and $G_T$ be groups of prime order $q$. A map $e: G \times G \to G_T$ must satisfy the following properties:

(a) Bilinearity: a map $e: G \times G \to G_T$ is bilinear if $e(a^x, b^y) = e(a, b)^{xy}$;

(b) Non-degeneracy: for all generators $g$, $h \in G$, $e(g, h)$ generates $G_T$;

(c) Efficiency: there exists an efficient algorithm $BMGen(1^k)$ that outputs $(q, G, G_T, e, g)$ to generate the bilinear map and an efficient algorithm to compute $e(a, b)$ for any $a, b \in G$.

BLS Signatures

Let $H: \{0, 1\}^* \to G$ be a collision resistant hash function. The BLS signature scheme is as follows. The secret key of the signer is $$x \xleftarrow{r} Z_q$$

and the public key is $y \leftarrow g^x$. To sign a message $m \in \{0, 1\}^*$, the signer computes $s \leftarrow H(m)^x$. Note that $e(y, H(m)) = e(g, s) = e(g, H(m))^x$. A signature s is verified by checking whether $e(y, H(m)) = e(g, s)$ holds.

Blind BLS Signatures

The blind BLS signature scheme (described in detail in "Efficient threshold signatures, multisignatures and blind signatures based on the Gap-Diffie-Hellman-group signature scheme", Boldyreva, Public Key Cryptography 2003, Lecture Notes in Computer Science Vol. 2567, Springer-Verlag, 2003 mentioned earlier) is as follows.

To get a message $m \in \{0, 1\}^*$ blindly signed, the user picks a random number $$r \xleftarrow{r} Z_q,$$

computes $m' = H(m) g^r$, and sends it to the signer. The signer computes $s' \leftarrow m'^x$ and sends it to the user. The user finally computes the signature $s \leftarrow s' y^{-r}$. Note that $s = H(m)^x$ will hold and thus s is a valid signature on m.

The implementation to be described assumes that an authentication server S can implement the signature scheme for multiple users $U_i$ having respective user computers $C_i$. Each user $U_i$ has a respective user password $p_i$. Let $y_i = g^{x_i}$ be a user's public key and $x_i$ be her secret key for the signature scheme. We assume that the user computers $C_i$ and server S have run a setup protocol at the end of which the user computer shares with the server the secret key $x_i$. The user computer then stores a first key-share $c_i$, a secret value $k_i$, and a public key $z_i = g^{d_i}$ for the key-share $d_i$ of the server S. The server S stores a second key-share $d_i$ and the first authentication value $h_i = H(k_i, p_i)$. In this elegantly simple example, $x_i = c_i + d_i$. (Other sharing methods for $x_i$ are of course possible, so the signing key $x_i$ may be some other function of the key shares $c_i$ and $d_i$ in dependence on the particular signature protocol employed).

To sign a message m at a user computer $C_i$, the following protocol is run between the user computer $C_i$ and the server S.

1. $U_i$ starts $C_i$ with input m and $p_i$ (steps (a) and (b) of FIG. 2a).

2. $C_i$ requests a nonce from S and receives nonce n (steps (c) and (d) of FIG. 2a).

3. $C_i$ chooses a random $$r \xleftarrow{r} Z_q,$$

computes a blinded message $m' \leftarrow H(m) g^r$, computes a second authentication value $h' \leftarrow H(n, H(k_i, p_i))$, and sends m', h' and $U_i$ (i.e., the user id) to S (steps (e) to (g) of FIG. 2a).

4. S looks up the values stored for $U_i$, verifies whether $h' = H(n, h_i)$, if so uses the key-share $d_i$ to compute the partial signature $s' \leftarrow m'^{d_i}$, and sends s' to $C_i$ (steps (h) to (k) of FIG. 2b).

5. $C_i$ uses the first-key share $c_i$, and an unblinding function $B(r) = z_i^{-r}$ for this scheme, to compute the signature s from m and the partial signature s' as $s \leftarrow s' z_i^{-r} H(m)^{c_i}$. $C_i$ verifies s in this example by checking $e(y_i, H(m)) = e(g, s)$, and then outputs the signature s (steps (l) and (m) of FIG. 2b). It can be seen that the unblinding function $B(r) = z_i^{-r} = 1/g^{rd_i}$ here operates on the partial signature $s' = m'^{d_i} = H(m)^{d_i} g^{rd_i}$ to unblind the blinded message in the partial signature via $B(r) s' = (H(m)^{d_i} g^{rd_i})/g^{rd_i} = H(m)^{d_i}$, whereby the final signature $s = H(m)^{d_i} H(m)^{c_i} = H(m)^{c_i + d_i} = H(m)^x$ as required.

It can be seen that the above embodiment provides a particularly secure and efficient signature scheme. In prior password-based signature schemes discussed earlier, though the signing process may fail if the user password is incorrect, the server itself has no means of checking whether the password is correct. In contrast, a signature is only generated in the above scheme if input of a valid user password has been verified at the authentication server. If the password is not correct, then the server can detect this and take appropriate action. In particular, throttling measures can be employed to frustrate online attacks. Various such throttling measures are known in the art and any convenient technique can be employed here. For example, the number of permitted user requests with an incorrect password may be restricted, and/or a gradually-increasing time limit may be applied for servicing user requests following each incorrect password entry. If more than a threshold number of attempts are made for the same account $U_i$, then the server can refuse to cooperate in further protocols, and passwords etc. may be revoked. The information stored on the user computer 2, together with the communications in operation of the signature protocol, do not allow for an off-line password guessing attack. Similarly, the information stored on the authentication server 3, together with the protocol communications, do not allow for an off-line password guessing attack. These security features result from use of the authentication values in the above system. Use of the user secret $k_i$ in the first authentication value and the nonce n in the second authentication value make the system particularly secure. The authentication server 3 does not learn the message that is signed, and neither the user nor the authentication server can sign alone. Moreover, it is not possible to extract information from either the user computer 2 or the authentication server 3 about the key-share of the other party. Overall, therefore, the above system offers an exceptionally secure and efficient scheme for generation of cryptographic signatures while protecting signing keys against theft or misuse.

While an exemplary system has been descried above, many alternatives and modifications can be envisaged. In some embodiments, for example, the secret value k encoded in first authentication value h could be the user key-share c, whereby no additional secret k need be stored at the user computer 2. Also, while the above system produces a BLS signature under the shared key x, alternative embodiments can be based on other signature schemes as will be readily apparent to those skilled in the art. In general, items described as encoding certain elements may also encode additional elements if desired. Further, while a simple data processing system 1 is described for illustrative purposes above, various other forms of data processing system can be envisaged and the particular form of the user computer and authentication computer is orthogonal to operation of the signature scheme. The user computer, for instance, may be implemented by a mobile phone, PDA (personal digital assistant), etc. in other embodiments.

It will be appreciated that many other changes and modifications can be made to the exemplary embodiments described without departing from the scope of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A user computer configured to produce a cryptographic signature on a message under a key which is shared between the user computer and an authentication computer, wherein the authentication computer stores a second key-share and a first authentication value which encodes a secret value of the user computer and a predetermined user password, the user computer comprising memory configured to store a first key-share, a user interface, a communications interface configured to communicate with the authentication computer, and control logic configured to:

in response to provision of the message and input, via said user interface, of said user password, to encode the message to produce a blinded message, to produce said first authentication value from the user password and said secret value and produce a second authentication value which encodes the first authentication value and a nonce, and to send the second authentication value and the blinded message to the authentication computer via said communications interface; and in response to receipt from the authentication computer of a partial signature produced by encoding the blinded message using the second key-share, to produce a signature on the message under said key by encoding the partial signature and the message using the first key-share and an unblinding function configured to unblind the blinded message in the partial signature.

2. A user computer as claimed in claim 1, wherein said secret value comprises the first key-share.

3. A user computer as claimed in claim 1, wherein said secret value differs from the first key share and is stored in said memory in use.

4. The user computer as claimed in claim 1, wherein the control logic is further configured to, prior to producing the second authentication value, send a nonce request to the authentication computer and receive the nonce from the authentication computer in response to the nonce request.

5. The user computer as claimed claim 1, wherein the control logic is further configured to select a random value and use the random value to encode the message to produce the blinded message.

6. The user computer as claimed in claim 1, wherein the key comprises a sum of the first and second key-shares.

7. A data processing system comprising the user computer as claimed in claim 1.

8. An authentication computer configured to generate a partial signature to produce a cryptographic signature on a message, under a key, at a user computer wherein the key is shared between the user computer, which stores a first key-share, and the authentication computer, the authentication computer comprising:

memory configured to store a second key-share and a first authentication value which encodes a secret value of the user computer and a predetermined user password;

a communications interface configured to communicate with the user computer; and control logic configured to, in response to receipt from the user computer of a blinded message, which is produced at the user computer by encoding the message to be signed, and a second authentication value which is produced at the user computer by encoding a nonce and said first authentication value, use said nonce and the first authentication value stored in the memory to determine if the first authentication value encoded in the second authentication value is correct and, if so, to encode the blinded message using the second key-share to produce the partial signature and send the partial signature via said communications interface to the user computer.

9. The authentication computer as claimed in claim 8, wherein the control logic is further configured to receive a nonce request from the user computer and in response to receipt of the nonce request, send the nonce to the user computer prior to receipt of the blinded message.

10. The authentication computer as claimed in claim 8, wherein the key comprises a sum of the first and second key-shares.

11. A data processing system comprising the authentication computer as claimed in claim 8.

12. A non-transitory computer program product configured to produce a cryptographic signature on a message, under a key, wherein the key is shared between a user computer and an authentication computer of a data processing system, wherein the user computer is configured to store a first key-share, and the authentication computer is configured to store a second key-share and a first authentication value which encodes a secret value of the user computer and a predetermined user password, the computer program product comprising a computer readable storage medium having program instructions, the program instructions executable by the user computer and the authentication computer which, when executed, causes the user computer and the authentication computer to:

at the user computer, in response to provision of the message and input of said user password, encode the message to produce a blinded message, produce said first authentication value from the user password and said secret value and produce a second authentication value which encodes the first authentication value and a nonce, and send the second authentication value and the blinded message to the authentication computer;

at the authentication computer, in response to receipt of the blinded message and the second authentication value, use said nonce and the first authentication value stored in the authentication computer to determine if the first authentication value encoded in the second authentication value is correct and, if so, encode the blinded message using the second key-share to produce a partial signature and send the partial signature to the user computer; and at the user computer, produce a signature on the message under said key by encoding the partial signature and the message using the first key-share and an unblinding function to unblind the blinded message in the partial signature.

13. The computer program product as claim in claim 12, wherein said secret value comprises the first key-share.

14. The computer program product as claim in claim 12, wherein said secret value differs from the first key share and is stored in memory.

\* \* \* \* \*